United States Patent Office 2,954,411
Patented Sept. 27, 1960

---

2,954,411

PROCESS FOR THE PREPARATION OF CYCLOPROPANES

Marion F. Hawthorne, Huntsville, Ala., assignor to Rohm & Haas Company, Philadelphia, Pa., a corporation of Delaware No Drawing. Filed June 19, 1959, Ser. No. 821,367

6 Claims. (Cl. 260—666)

This invention concerns the preparation of cyclopropane and substituted derivatives thereof. It further concerns a process for the production of very pure cyclopropane in high yields.

Cyclopropane has heretofore been prepared by the reaction of trimethylene dihalides with finely-divided metal reducing agents in various liquid reaction media (in which the metal is suspended and the dihalide is more or less dissolved), e.g., by the reaction of trimethylene dibromide with zinc dust in aqueous ethanol. While this procedure has been developed to a high state of efficiency, the use of liquid reaction media gives rise to certain complications, inter alia, the economic necessity of recovering the medium if essentially alcoholic, and the occurrence of side reactions due to or involving the medium.

The prior art also cites a process which is reputed to be superior to the prior art processes set forth hereinbefore. This process comprises reacting in the vapor phase at a preferred temperature of about 200–300° C. a trimethylene dihalide with a metal reducing agent. Based on the information given on this process, yields of cyclopropane are low, any unreacted trimethylene dihalide being recovered and recycled. It is also true that the metal reducing agent becomes fouled, and must be periodically reactivated. Because the reaction is not quantitative, the cyclopropane which is produced must be carefully purified. The reaction temperature employed, namely 200–300° C., promotes side reactions, and the formation of undesirable by-products. These by-products must also be removed from the cyclopropane.

It is well known that cyclopropane is widely used as a general anaesthetic, having advantages over ether and similar gases in that it is relatively odorless, non-irritating, and rapid in action. For such use, obviously, it must be of highest purity.

The higher derivatives of cyclopropane are also used in insecticides.

It is known that vinyl chloride will react with diborane, but the products so produced are thermally unstable even at room temperature, and it is generally impossible to separate and identify the products which result from the reaction.

Surprisingly, it has been found that allyl halides and substituted allyl halides react with diborane to produce products which are stable and which can be clearly defined. Furthermore, on reacting these products with a base, high purity cyclopropane and substituted cyclopropanes are produced in high yields.

It is postulated that the reaction between allyl halides and substituted allyl halides and diborane proceeds as follows:

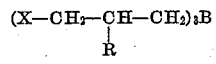

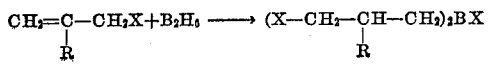

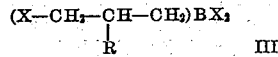

In the formulas hereinbefore set forth,

R is a radical selected from the group consisting of hydrogen, alkyl, and aryl, and X is a halogen with an atomic number from 17 to 35.

The diborane addition product of the allyl chloride was prepared by passing the gaseous diborane into the allyl chloride dissolved in an inert solvent. Since the addition compound reacts violently with $H_2O$, it is imperative that all reagents and the reactor be thoroughly dry. When all the diborane has been added, the reactor is swept with dry nitrogen and the solvent is removed by vacuum distillation. To the addition product so formed is added slowly a 10% aqueous solution of sodium or potassium hydroxide. The reaction is exothermic and cooling is applied to maintain the reaction mixture at about 20° C. to about 70° C. If the cyclopropane is low boiling, then it is distilled from the reaction mixture. If the cyclopropane is higher boiling, such as phenyl cyclopropane, the reaction mixture is poured into water, the organic layer is separated, and the aqueous layer is extracted with a water-insoluble solvent, such as heptane, methylene dichloride, or diethyl ether. The organic layer and the solvent solution are combined and the cyclopropane recovered therefrom.

Suitable allyl compounds include allyl chloride, methallyl chloride, 2-phenylallyl chloride, 2-benzylallyl chloride, 2-butylallyl chloride and the corresponding bromides.

The molar ratios of the allyl halides to the diborane can be varied appreciably within the scope of the present invention. Thus a mole of allyl halide may be used per 0.5 mole of diborane or the ratio may be 1:1. A molar ratio of 3 moles allyl halide to 0.5 mole diborane is the preferred embodiment.

The temperature of the reaction mixture during the addition of the diborane to the allyl halide can be varied from about −10° C. to about 35° C., with ambient temperatures, i.e. 15 to 20° C. being the preferred range.

The inert solvent employed during the addition of the diborane to the allyl halide is a solvent which does not react with either the diborane or the allyl halide. Typical of such solvents are dimethyl ether, diethyl ether, the dimethyl ether of diethylene glycol and tetrahydrofuran.

The molar ratio of sodium or potassium hydroxides, added to a 10% aqueous solution, per mole of halide ion can be varied from 1 to 1 to 2 to 1. It is preferred to use a slight excess of the hydroxide, and 1.25 moles hydroxide to 1 mole halide ion represents the preferred embodiment. As set forth hereinbefore, the temperature during addition may be from about 20° C. to about 70° C. A temperature of from 40° C. to 50° C. is preferred.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise stated.

*Example 1*

To a solution of 225 parts of allyl chloride dissolved in 400 parts of the dimethyl ether of diethylene glycol was added 14 parts of diborane diluted with an equal volume of dry nitrogen. The addition was carried out at room temperature (15–25° C.) with adequate stirring. The apparatus was swept with nitrogen following the addition and a solution of 150 parts of sodium hydroxide in 1500 parts of water was added at such a rate as to maintain a temperature of 50–60° C. During the addition of the sodium hydroxide solution the gas outlet was attached to two condensation traps immersed in Dry Ice. Cyclopropane was collected in the Dry-Ice cooled traps, combined by distillation and weighed. Yield was 75 parts of pure cyclopropane (60%), B.P. —34° C.

*Example II*

To a solution of 267 parts of methyl allyl chloride dissolved in 400 parts of the dimethyl ether of diethylene glycol was added 14 parts of diborane diluted with an equal volume of dry nitrogen. The addition was carried out at room temperature (15–25° C.) with adequate stirring. The apparatus was swept with nitrogen following the addition and a solution of 150 parts of sodium hydroxide in 1500 parts of water was added at such a rate as to maintain a temperature of 50–60° C. During the addition of the sodium hydroxide solution the gas outlet was attached to two condensation traps immersed in Dry Ice. Cyclopropane was collected in the Dry-Ice cooled traps, combined by distillation and weighed. Yield was 135 parts of methyl cyclopropane (80%), B.P. 5° C.

In the same manner, an equimolar amount of 2-phenyl-allyl chloride was substituted for the allyl chloride of Example I. An 80% yield of phenylcyclopropane was obtained.

2-benzylallyl bromide similarly yielded benzylcyclopropane.

2-butylallyl bromide gave butylcyclopropane.

I claim:

1. A process for the preparation of cyclopropanes which comprises reacting at a temperature of from about —10° C. to about 35° C., in the presence of an inert solvent, allyl halides with diborane, subjecting the resulting reaction mixture to further reaction with an alkali selected from the group consisting of aqueous solutions of sodium hydroxide and potassium hydroxide, and separating the cyclopropanes from the final reaction mixture.

2. A process for the preparation of cyclopropane and substituted cyclopropane which comprises reacting at a temperature of from about —10° C. to about 35° C., in the presence of an inert solvent, allyl halides of the general formula

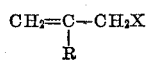

in which R is a radical selected from the group consisting of hydrogen, alkyl, aryl, and X is a halogen with an atomic number from 17 to 35, with diborane, subjecting the reaction mixture to further reaction with an alkali selected from the group consisting of aqueous solutions of sodium hydroxide and potassium hydroxide, and separating from the final reaction mixture a cyclopropane of the formula

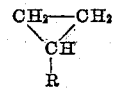

in which R is a radical as hereinbefore set forth.

3. A process as set forth in claim 2 in which the inert solvent is selected from the group consisting of diethyl ether, dimethyl ether of diethylene glycol and tetrahydrofuran.

4. A process as set forth in claim 2 in which the molar ratio of allyl halides to diborane is from about 1 to about 3 moles of the allyl halide to about 0.5 to about 1 mole of diborane.

5. A process as set forth in claim 2 in which the reaction between the allyl halide and the diborane is conducted at a temperature from 15° to 20° C., the reaction mixture being then brought to room temperature, and the reaction with the alkali being conducted at a temperature from 20° C. to about 70° C.

6. A process as set forth in claim 2 in which the allyl halide is an allyl chloride.

References Cited in the file of this patent

UNITED STATES PATENTS

| | | |
|---|---|---|
| 2,276,922 | Buchman et al. | Mar. 17, 1942 |
| 2,325,591 | Christiansen et al. | Aug. 3, 1943 |
| 2,325,628 | Ort | Aug. 3, 1943 |
| 2,496,419 | Sommer | Feb. 7, 1950 |